United States Patent [19]

Leng et al.

[11] Patent Number: 4,502,888
[45] Date of Patent: Mar. 5, 1985

[54] AQUEOUS DISPERSIONS OF PLASTICIZED POLYMER PARTICLES

[75] Inventors: Douglas E. Leng; Wilmer L. Sigelko; Frank L. Saunders, all of Midland, Mich.

[73] Assignee: The Dow Chemical Company, Midland, Mich.

[21] Appl. No.: 449,297

[22] Filed: Dec. 13, 1982

[51] Int. Cl.³ .................. C08L 1/08; C08L 27/00
[52] U.S. Cl. ............................ 106/170; 106/171; 106/178; 106/194; 106/198; 524/284; 524/569
[58] Field of Search ............. 106/178, 170, 171, 194, 106/198; 524/415, 416, 284, 569

[56] References Cited

U.S. PATENT DOCUMENTS

| | | | |
|---|---|---|---|
| 2,345,879 | 4/1944 | Moore | 524/601 |
| 2,346,041 | 4/1944 | Morgan | 106/170 |
| 2,373,347 | 4/1945 | Schoenfeld | 524/569 |
| 2,460,582 | 2/1947 | Japs | 524/569 |
| 2,553,617 | 5/1951 | Wendt | 106/170 |
| 2,776,904 | 1/1957 | Brown | 106/170 |
| 3,522,070 | 7/1970 | Webb | 106/170 |
| 3,642,676 | 2/1972 | Saunders | 524/110 |
| 4,158,648 | 6/1979 | Meadus et al. | 106/171 |
| 4,357,168 | 11/1982 | Zwiegle et al. | 106/171 |

OTHER PUBLICATIONS

Chem Abst., 80:38097b.

*Primary Examiner*—Theodore Morris

[57] ABSTRACT

Aqueous dispersions of water-insoluble polymers employ fatty acid salts as plasticizers/stabilizers. These dispersions may be coagulated by adjusting the pH until the fatty acid salts are converted to free acid form.

26 Claims, No Drawings

AQUEOUS DISPERSIONS OF PLASTICIZED POLYMER PARTICLES

BACKGROUND OF THE INVENTION

This invention relates to aqueous dispersions of plasticized polymer particles.

For the use of polymeric materials in certain applications, such as in coatings, it is often desirable to employ the polymer as a dispersion of small (i.e., 0.1 to 10 microns) particles in a continuous aqueous phase. While certain polymers are prepared directly as a dispersion using an emulsion polymerization process, it is often desirable to prepare the polymer by processes other than emulsion polymerization. Furthermore, many polymers are not amenable to an emulsion polymerization process. In such cases a dispersion must be prepared by dispersing a previously formed polymer into an aqueous phase. These so-called "artificial latexes" contain an emulsifying agent, i.e., a surfactant, which facilitates dispersion of the polymer and prevents the dispersed polymer particles from agglomerating, or settling out of the dispersion. Unfortunately, however, this surfactant generally remains with the polymer upon coalescence of the dispersed particles such as in film formation. This residual surfactant can phase out the coalesced polymer, or interact with water which comes into contact with the polymer, thereby impairing the properties of the polymer. In addition, this residual surfactant often imparts some hydrophilic character to the coalesced particles which is undesirable in certain applications, such as in electrostatic coatings, where good electrical resistance is desired.

Moreover, many polymers must be plasticized in order to impart to the polymers the physical characteristics necessary for their intended use. Such plasticization is generally effected by adding to the polymer a compound which improves the physical characteristics thereof. In conventional "artificial" latexes, such plasticizers are often added to the microdispersion after the polymer is dispersed into the aqueous phase. Thus, plasticization of conventional "artificial" latexes requires the insertion of an additional component and, often, an additional processing step into the preparation of the dispersion.

Accordingly, it would be desirable to provide a stable dispersion of a water-insoluble polymer which, when coalesced into the desired form, contains no surfactant which can phase out of the polymer. It would further be desirable to provide a dispersion of a water-insoluble polymer which does not require the addition of a plasticizer after the dispersion of the polymer into the aqueous phase.

SUMMARY OF THE INVENTION

This invention is such a dispersion. The present dispersion is a polymeric dispersion comprising (a) a plurality of particles of a water-insoluble thermoplastic polymer dispersed in (b) a continuous aqueous phase, said dispersion further comprising (c) a plasticizing composition which is compatible with and plasticizes said polymer, said plasticizing composition comprising an amount of a water-soluble salt of a carboxylic acid sufficient to stabilize the dispersion, said carboxylic acid being one which is a plasticizer for the polymer.

In another aspect, this invention is a process for preparing aqueous plasticized polymeric dispersions. The process of this invention comprises (a) melting together a mixture of a water-insoluble thermoplastic polymer with a plasticizing composition which is compatible with said polymer, said plasticizing composition comprising a carboxylic acid or salt thereof, said carboxylic acid being one which, when in salt form, emulsifies the polymer and stabilizes the resulting dispersion, then (b) contacting said melted mixture with an aqueous phase under conditions of shear and pH such that said heat plasticized mixture is dispersed into the aqueous phase as a plurality of particles and sufficient carboxylic acid is converted to salt form to emulsify the polymer and stabilize the dispersed polymer particles and then (c) cooling the resulting dispersion below the melting point of the plasticized polymer.

The polymeric dispersions of this invention may be coalesced by lowering the pH thereof until the organic acid salt is converted to the acid. In free acid form, said organic acid is no longer able to stabilize the dispersion, and the dispersion coalesces. The coalesced polymer contains no surfactants which can phase out and spoil its appearance or properties. Further, the coalesced polymer will generally exhibit reduced sensitivity to water than polymers coalesced from conventional dispersions. Additionally, the coalesced polymer has improved physical properties as compared to polymers of corresponding unplasticized dispersions which are stabilized using conventional surfactants. In addition, the dispersions of this invention are prepared using inexpensive and readily available materials which in many cases are approved for food use.

DETAILED DESCRIPTION OF THE INVENTION

The polymers which are suitably employed herein are those which are normally solid, insoluble in aqueous solution, thermoplastic and compatible with the plasticizing compositions employed herein. Preferably, the polymers employed herein have a glass transition point ($T_g$) after plasticization with the plasticizing composition such that it melts in the range from about 50°–200° C., preferably 50°–170° C.

"Compatible with the plasticizing composition" means that the plasticizing composition is miscible with or soluble in the polymer at the relative proportions thereof present in the dispersion. While not a definitive test, compatibility can often be evaluated by melting together the polymer and the plasticizing composition in the desired proportions, thoroughly mixing the melted polymer and plasticizing composition and then cooling the mixture. Good compatibility is evidenced by essentially no separation of the polymer from the plasticizing composition, and/or transparency or translucency of the cooled mixture.

While various polymers meet the foregoing criteria, of particular interest herein are thermoplastic derivatives of cellulose, including cellulose ethers such as cellulose acetate, cellulose propionate, cellulose butyrate, cellulose acetatebutyrate and the like, and cellulose ethers such as ethylcellulose and ethylhydroxypropylmethylcellulose. Ethylcellulose is especially preferred.

The polymer is present in particulate form, the volume average particle size generally being from about 0.1 to 20 microns in diameter. Preferably, the particles are less than 10 microns in diameter, more preferably less than 5, most preferably less than 2, microns in diameter.

The aqueous dispersions of this invention also contain a plasticizing composition comprising a water-soluble salt of a carboxylic acid. This plasticizing composition is one which (a) plasticizes the polymer and (b) contains a sufficient amount of a water-soluble salt of a carboxylic acid to maintain a stable dispersion of the polymer in the aqueous phase. As used herein the term "plasticize" means that at the relative proportions of polymer and plasticizing composition present in the dispersion, the plasticizing composition (a) lowers the $T_g$ temperature of the polymer to be dispersed and (b) is compatible, i.e., is soluble in or miscible with, the dispersed polymer.

The $T_g$ of the plasticized polymer must be high enough that the plasticized polymer is a solid at ambient temperatures (i.e., about $-10°$ to $30°$ C.). On the other hand, the $T_g$ of the plasticized polymer is advantageously such that (a) the plasticized polymer melts substantially without degradation of the polymer and (b) the plasticized polymer melts at a temperature sufficiently low that it can be reasonably easily dispersed into the aqueous phase. By carrying out the dispersion of the polymer into the aqueous phase at elevated pressures, the melting point of the plasticized polymer may be as high as about $200°$ C. Preferably, the plasticized polymer melts in the range from about $50°-170°$ C.

In addition, the plasticized polymer typically and preferably exhibits improved physical properties after it is coalesced out of the dispersion. Such improvement in the physical properties is generally seen as increased elongation at break, increased impact resistance and the like. In general, such improved physical properties are seen in the coalesced polymer when the $T_g$ thereof is adjusted as described hereinbefore.

As explained more fully below, the carboxylic acid, while in salt form in the dispersion, is typically and preferably in the acid form both prior to the formation of the dispersion and after the dispersed polymer is coalesced out of the dispersion. Thus, the plasticization of the polymer by the plasticizing composition is typically and preferably seen when the carboxylic acid is in the acid form.

The plasticizing composition comprises a salt of a carboxylic acid. While not intended to be bound by any theory, it is believed that the carboxylic acid employed in this invention has a four-fold function. First, when the carboxylic acid is blended with the polymer to be dispersed, the carboxylic acid lowers the $T_g$ of the polymer, and consequently, lowers the temperature required to heat plastify the polymer for dispersal into the aqueous phase. As explained more fully hereinafter, the carboxylic acid may be, and preferably is, in free acid form prior to the dispersal of the polymer into the aqueous phase. The second function of the carboxylic acid is to act as an emulsifying agent in the dispersal of the polymer into the aqueous phase. In performing this second function, some or all of the carboxylic acid is in salt form. The salt form of the carboxylic acid is generally and preferably prepared by contacting the melted mixture of polymer and carboxylic acid with a base-containing aqueous phase as described hereinafter. The third function of the carboxylic acid is to stabilize the dispersed polymer particles, i.e., to substantially prevent the agglomeration or settling of the dispersed particles. In this function, some or all of the carboxylic acid is in the salt form. The fourth function of the carboxylic acid is to plasticize the polymer after it is coalesced out of the dispersion. In this function, the carboxylic acid may be in salt form, but typically and preferably is in the free acid form.

Suitable carboxylic acids include those as represented by the general formula

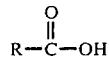

wherein R is an inertly substituted $C_{6-30}$ saturated or unsaturated aliphatic radical or an inertly substituted alkoxylated or $C_{6-22}$ aliphatic substituted phenyl radical. By "inertly substituted" is meant that R contains no substituents which interfere with its ability to plasticize and stabilize the polymer particles or which react with the polymer particles or other components of the dispersion. Exemplary inert substituents include, for example, alkyl, aryl, unsaturated hydrocarbyl, halogen, hydroxyl, alkoxyl, polyalkoxy and the like. Preferably, R is a $C_{8-22}$ saturated or unsaturated aliphatic radical and the carboxylic acid is one of the so-called "fatty acids." Exemplary fatty acids include, for example, palmitic, oleic, stearic, linoleic, linolenic, ricinoleic, arachidonic, palmitoleic and like acids.

In the dispersion, some or all of the carboxylic acid is in the salt form, with the cation being any which forms a water-soluble salt of the carboxylic acid. Suitable cations include the alkali metals, ammonium, or primary, secondary, tertiary or quaternary ammonium ions. Since the dispersions of this invention are advantageously coalesced by the conversion of the carboxylic acid salt to free acid form, it is preferred that the cation be volatile. In such cases, carboxylic acid is converted to acid form by heating and driving off the volatile cation. Accordingly, ammonium ion, i.e., $NH^{\oplus}_4$, or other volatile ammonium ions, are generally preferred for most applications. When alkali metal ions are employed, the addition of acid is often required to break the dispersion. The cation reacts with the acid to form a salt which is usually water soluble. The presence of such salts in the coalesced polymer may be undesirable in certain applications, such as in coatings, where the salts may leach out upon contact with water, thereby forming void spaces in the coating. Thus, except in applications where the presence of such salts in the polymer is desirable, the use of alkali metal ions is generally less preferred.

The carboxylic acid (in salt form) may be the sole component of the plasticizing composition, or other plasticizers may be employed in conjunction with the carboxylic acid salt. However, in either embodiment, sufficient carboxylic acid salt must be present to stabilize the dispersion. While the amount of carboxylic acid salt required to stabilize the dispersion may depend somewhat on the particular acid salt and polymer employed, generally the carboxylic acid comprises at least about 8, preferably at least 10, weight percent of the total solids (i.e., polymer plus plasticizing composition) in the dispersion.

In addition to the carboxylic acid salt, the plasticizing composition may contain one or more other plasticizers for the polymer to be dispersed. Said other plasticizers are advantageously chosen such that they are not hydrophilic and the plasticizing composition is compatible with the polymer. Such other plasticizers advantageously comprise from about 0 to 42, preferably 0-20, weight percent of the solids in the dispersion. Exemplary such other plasticizers include alkyl esters of carboxylic acids; in particular $C_1$–$C_6$ alkyl esters of fatty acids, or $C_1$–$C_4$ alkyl esters of phthalic or sebacic acid, polypropylene glycol; castor oil; coconut oil; and the like. Advantageously, this other plasticizer is edible and approved for food use. Said other plasticizer is compatible with both the polymer and the carboxylic acid salt, and may be employed to increase the compatibility of the carboxylic acid salt with the polymer.

The plasticizing composition is employed in an amount sufficient to (a) plasticize the polymer and (b) stabilize the dispersion. Generally, the plasticizing composition may comprise from about 8 to about 50 percent of the combined weight of polymer and plasticizing composition. Preferably, the plasticizing composition will comprise about 20–30, more preferably from about 22–26, percent of the weight of the polymer and plasticizing composition.

The aqueous phase is present in an amount such that the aqueous phase is continuous. Although large quantities of water may be added to the dispersion, it is generally preferable to have a high solids dispersion. The pH of the aqueous phase is generally sufficiently high that enough of the carboxylic acid is in salt form to stabilize the dispersion.

The dispersions of this invention are advantageously prepared by melting a mixture of the polymer to be dispersed and the plasticizing composition. This mixture of polymer and plasticizing composition is referred to herein as "plasticized polymer." The melted plasticized polymer is contacted with the aqueous phase under conditions of shear such that the plasticized polymer is dispersed into the aqueous phase as a plurality of particles. Said aqueous phase has a pH such that sufficient of the carboxylic acid component in the plasticizing composition is in salt form to emulsify the polymer and stabilize the resulting dispersion. The dispersion thus formed is then cooled below the melting point of the plasticized polymer.

In preparing the plasticized polymer, the polymer and plasticizing composition are advantageously mixed together in the desired proportions. It is desirable to form a relatively homogeneous mixture. Accordingly, thorough mixing of the polymer with the plasticizing composition before melting is generally beneficial. In addition, it is also advantageous to agitate the melted plasticized polymer before dispersing it into the aqueous phase, in order to obtain a more homogeneous mixture thereof.

In preparing the melted plasticized polymer, the carboxylic acid may be in either the salt or free acid form. However, certain salts of the carboxylic acid are not stable at the temperatures used to melt the plasticized polymer. For example, ammonium salts generally cannot be used in preparing the melted plasticized polymers, since ammonia and other volatile amines will volatilize or break down during the melting process. In addition, the compatibility of the plasticizing composition with the polymer is generally improved when the acid form of the carboxylic acid is used. Accordingly, the use of the acid form of the carboxylic acid is generally preferred.

Upon dispersing the melted plasticized polymer into the aqueous phase, sufficient of the carboxylic acid must be in the salt form to emulsify the plasticized polymer and to stabilize the resulting dispersion. As described hereinbefore, the carboxylic acid may be in the salt form when melted together with the polymer. In such a case, the aqueous phase must have a pH sufficiently high to prevent the protonation of the acid salt. Preferably, however, the carboxylic acid salt is generated in situ upon contacting the plasticized polymer with the aqueous phase. In such a case, the aqueous phase has dissolved therein an alkaline material which will react with the carboxylic acid to form the corresponding carboxylic salt. Typical of such alkaline materials are the soluble metal hydroxides such as sodium, lithium, potassium and cesium hydroxide. However, since ammonium salts are generally preferred herein, an amine, especially a volatile amine, and ammonia are preferred alkaline materials. Sufficient alkaline material is present in the aqueous phase to generate an amount of the carboxylate salt sufficient to emulsify the polymer and stabilize the resulting dispersion. The point at which sufficient of the carboxylic acid is ionized (i.e., converted to salt form) depends somewhat on the particular acid and polymers employed, but in general, adjustment of the pH of the aqueous phase into the range from about 8.5–11.5, preferably about 9–10.5 is generally sufficient. In practice, an excess amount of alkaline material, preferably from about 1.2 to about four times the stoichiometric amount, may be added, especially when the alkaline material is volatile.

Any suitable means for dispersing the melted plasticized polymer into the aqueous phase may be employed herein, as long as the desired particle size distribution is obtained. For example, conventional batch-type mixers, static mixers, rotary mixers and the like are suitably employed herein. While the dispersion of the polymer into the aqueous phase may be performed batch-wise, a continuous process such as described in U.S. Pat. No. 4,123,403 to Warner et al. (incorporated herein by reference in its entirety) is preferred. Such continuous processes often afford higher yields and smaller particles than batch-type processes. In general, it is preferable to obtain dispersed particles having a volume average particle diameter of 10 microns or less, more preferably less than 5 microns. Conditions for achieving such particle sizes are considered to be within the ordinary skill of the skilled artisan and are not considered critical to the invention.

Following the dispersal of the plasticized polymer into the aqueous phase, the dispersion is cooled below the melting point of the plasticized polymer in order to solidify the dispersed particles.

Following formation of the aqueous polymer dispersion, the solids content of the dispersion can be adjusted as desired. In addition, conventional additives, such as surfactants, bactericides, and the like can be added to the dispersion in any convenient conventional manner. Often, the color of the dispersion is improved if a chelating agent, such as citric acid salt, is present to tie up metal ions.

In one embodiment of this invention, the aqueous phase has dissolved therein a quantity of a water-soluble polymer which is compatible with the dispersed plasticized polymer particles and which may be coalesced along with the dispersed plasticized polymer particles to form an article containing both the water-soluble polymer and the plasticized polymer. The water-soluble polymer may be added to the aqueous phase either before or after the dispersion is prepared. This embodiment of the invention is of particular interest when the dispersed plasticized polymer is a water-insoluble cellulose ether, such as ethylcellulose, and the water-soluble polymer is a cellulose derivative, such as methylcellulose or hydroxypropylmethylcellulose. When ethylcellulose/water-soluble cellulose ether articles are prepared from a dispersion of this invention having the water-soluble cellulose dissolved in the aqueous phase, said articles have surprisingly good physical properties such as elongation and tensile strength. The amount of water-soluble cellulose ether dissolved in the aqueous phase may range from about 1 to about 200 percent of the weight of the dispersed plasticized polymer present in the polymer, as long as the dispersion is stable, the viscosity of the dispersion is not so high as to make it difficult to prepare and use, and the articles prepared therefrom have the desired properties.

The dispersion may be coalesced by removing the water, and/or converting the carboxylic acid salt to the free acid form. The free acid form of the carboxylic acid is generally formed by lowering the pH of the aqueous phase. When the counterion on the carboxylic acid salt is nonvolatile, the pH is generally lowered by adding an acid, such as mineral acid to the dispersion. The procedure typically generates the free carboxylate acid and the acid salt of the counterion. When counterions such as ammonium ion are employed, coalescence is often achieved simply by allowing the counterion to be removed by volatilization, such as by air drying or heating the dispersion. In either instance, the coagulated polymer is free of emulsifying agents or stabilizers, and is plasticized by the plasticizing composition.

The aqueous polymer dispersion of this invention can be employed in a conventional manner in the preparation of protective and/or decorative coatings, paper coatings, adhesives, sizing compositions, carpet backing, electrical circuit board backings and the like. In addition, a finely plasticized divided polymer powder can be obtained from the aqueous polymer dispersion by dewatering the dispersion such as by spray drying or other conventional manner. Such powder can be employed in a conventional manner in a fluidized bed coating process, electrostatic coating or printing processes such as plastic pigments and paper coatings, etc.

In the following examples, the polymeric dispersions are prepared as follows. The polymer and the plasticizing composition are mixed in a Hobart Mixer in the proportions indicated in the examples. The polymer/carboxylic acid mixture is then fed into a $\frac{3}{4}$ inch, single screw, variable speed Brabender extruder. The extruder is heated using electrical band heaters to the temperatures noted in the examples. The flow rate of the polymer/plasticizing composition mixture through the extruder is specified in the particular examples. The melted plasticized polymer is then flowed into a static mixer to further intermix the polymer with the acid and to remove any lumps and the like therefrom. The material is then flowed into a continuous variable shear mixer substantially as described in FIG. 2 of U.S. Pat. No. 4,123,403. In said continuous variable shear mixer, the melted plasticized polymer enters a polymer inlet at one end (designated 16a in FIG. 2 of U.S. Pat. No. 4,123,403). The aqueous phase enters the mixer at inlet ports 6a and 8a of the mixer at the flow rates indicated in the various examples. Additional water is added at inlet port 10a to dilute the dispersion and cool the dispersion below the melting point of the plasticized polymer. In the examples, the mixer is pressurized to about 120 psi using nitrogen gas in order to prevent evaporation of the aqueous phase as it contacts the hot plasticized polymer.

The following examples are intended to illustrate the invention and not to limit the scope thereof. All parts and percentages are by weight unless otherwise specified.

EXAMPLE 1

Ethylcellulose (ethoxy content about 48–49.5 percent, viscosity of approximately 7 cps at 25° C. as a 5 percent solution in an 80 percent toluene/20 percent ethanol solvent) and oleic acid are mixed in a Hobart Mixer in a 75/25 weight ratio. This mixture is then fed at a rate of 10–11 g per minute through a Brabender extruder as described hereinbefore. The extruder is heated to about 140°–150° C. The resulting molten plasticized polymer is then flowed through a static mixer to remove any remaining lumps and then transferred through a heated conduit into the continuous variable shear mixer through polymer inlet 16a at a flow rate of 10–11 g per minute. The variable shear mixer is preheated to an internal temperature of about 155°–160° C. The mixer is variably operated at 300–1050 rpm (yielding a shear rate of 188–658 sec$^{-1}$). An ammoniated water solution containing 8 weight percent ammonia is injected into the mixer at a first inlet port (6a in FIG. 2 of U.S. Pat. No. 4,123,403) at an average rate of 1.5 ml per minute. A second 8 percent ammoniated water solution is injected into a second inlet port (8a in FIG. 2 of U.S. Pat. No. 4,123,403) at an average rate of 2.5 ml per minute. Water is injected into the mixer at inlet port 12a at an average rate of 22 ml per minute. In addition to diluting the dispersion, this water also cools the dispersion below the melting point of the plasticized polymer. The product dispersion, having about 30 percent solids, exits from the polymer outlet port 18a.

A film is cast from the product dispersion on a glass plate using a drawdown bar. The film (which is about 40 mil thick when wet) is cured by heating to 140° F. (60° C.) until dry. The dry film is approximately 5–7 mils thick. The dry film is conditioned by maintaining the film at 22° C. and 50 percent relative humidity for 24 hours. The conditioned film is cut into ½ inch wide strips and tested for tensile strength and elongation at break using Instron tensile tester. The initial jaw gap is 1 inch and the cross head speed is 2 inches per minute. The tensile strength and elongation at break are recorded as Sample No. 1 in Table I which follows Example 4. A Sample of the conditioned film is held under a stream of tap water for about 1 minute. Only slight clouding of the film is seen.

A portion of the product dispersion is mixed on a 1:1 weight basis (based on solids) with an aqueous solution of METHOCEL ® E hydroxypropyl methylcellulose ether sold by The Dow Chemical Company. A film is cast therefrom as described in this example. The tensile strength and elongation thereof are tested as described in this example, with the results given as Sample No. B-1 in Table II, which follows Example 4.

EXAMPLE 2

Ethylcellulose (as used in Example 1) and ricinoleic acid are blended in a 75/25 weight ratio in a Hobart mixer. The mixture is fed into an extruder and static mixer as in Example 1 and the molten material is fed into the variable shear mixer at an average feed rate of 10 g per minute. The plasticized polymer is at a temperature of 155° C. upon entering the variable shear mixer. The mixer is operated at 1000 rpm (628 sec$^{-1}$ shear rate). Ammoniated water (8 weight percent ammonia) is fed into inlet port 6a at a rate of 0.6 ml per minute and at inlet port 8a at a rate of 3.6 ml per minute. Water for dilution and cooling is added at inlet port 10a at a rate of 21 ml per minute. During the dispersion process, the pressure inside the mixer is maintained at 385 lbs/in$^2$ using nitrogen. The product dispersion has 30 percent solids with 60 volume percent of the particles having a diameter of less than 1 micron, and 90 volume percent having a diameter of less than 3 microns.

A film is prepared from the product dispersion using the general procedure described in Example 1. The tensile strength and elongation of break of the film is measured as in Example 1 with the results given as Sample No. 2 in Table I. This film shows slight cloudiness after being immersed in a stream of tap water for 1 minute.

The product dispersion is mixed on a 1:1 weight basis based on solids with an aqueous solution of METHOCEL ® E hydroxypropyl methylcellulose. A film is prepared therefrom according to the method of Example 1. The properties of the film are reported as Sample No. B-2 in Table II.

EXAMPLE 3

The procedure of Example 1 is again repeated this time employing a 75/25 mixture of ethylcellulose (as described in Example 1) and linoleic acid as the feed. The polymer/acid mixture is fed into the variable shear mixer at a rate of 11 g per minute. The extruder temperature is 140°–150° C. The melted plasticized polymer is then passed into the variable shear mixer (heated to 155°–170° C.) at a flow rate of 11 g/minute. A first stream of ammoniated water (8 weight percent ammonia) is added to the variable shear mixer at inlet port 6a at a constant rate of 1 ml per minute. A second 8 percent ammoniated water solution is added at inlet port 8a at a constant rate of 3.3 ml per minute. Dilution water is added at inlet port 10a at a rate of 21 ml per minute. The rotor speed is 1000 rpm yielding a shear rate of 628 sec$^{-1}$.

A film is cast from the product dispersion as in Example 1. This film is evaluated for tensile strength and elongation at break as in Example 1 with the results as given as Sample No. 3 in Table I following. The film shows no effect upon being contacted with a stream of tap water for about 1 minute.

For comparison, a film is cast from a conventionally prepared ethylcellulose dispersion containing cetyl alcohol and sodium lauryl sulfate as stabilizers. This dispersion is plasticized before forming the film by adding 20 weight percent (based on the weight of solids in the dispersion) of dibutyl sebacate. The tensile strength and elongation at break of these films are reported as Sample No. C in Table I following Example 4. This film turns cloudy upon contacting the conditioned film with tap water.

Also, for comparison, a 1:1 mixture (based on weight of solids) of the plasticized dispersion and an aqueous solution of METHOCEL ® E hydroxypropyl methylcellulose is prepared. Films are made therefrom, treated as in Example 1 and have properties as noted as Sample No. B-C in Table II.

EXAMPLE 4

The general procedure of Example 1 is again repeated, this time using an ethylcellulose having an ethoxyl content of 48–49.5 percent and a viscosity of about 20 cps at 25° C. as a 5 percent solution in a mixture of 80 percent toluene/20 percent ethanol. The plasticizing composition is 40 percent oleic acid and 60 percent dibutylsebacate. A 75/25 polymer/plasticizing composition mixture is prepared in a Hobart blender and fed into the extruder at a rate of about 11 g/min. The extruder is heated to 135°–140° C. The melted plasticized polymer is then fed into the variable shear mixer at a flow rate of about 11 g/min. The temperature inside the mixer is approximately 150°–155° C. The mixer is operated at 600 rpm, yielding a shear rate of 377 sec$^{-1}$. A first stream of ammoniated water (16 percent ammonia) is injected into inlet port 8a at a rate of 1.5 ml/min. A second stream of ammoniated water (16 percent ammonia) is injected into inlet port 8a at a rate of 4.2 ml/min. A water stream is injected into inlet port 10a at a rate of 17.5 ml/min.

A film is prepared from the product dispersion and evaluated according to the procedures described in Example 1, with the results reported as Sample No. 4 in Table I following. The conditioned film does not cloud or show other effects when contacted with tap water.

TABLE I

| Sample No. | Tensile Strength (psi) | Elongation at Break (%) |
|---|---|---|
| 1 | 784 | 11 |
| 2 | 781 | 18 |
| 3 | 1180 | 11.1 |
| 4 | 827 | 11.1 |
| C* | 704 | 8.1 |

*Not an example of the invention.

As can be seen from the Table I above, the films prepared from the dispersions of this invention exhibit improved tensile and elongation properties as compared to Comparative Sample No. C. In addition, the films of this invention exhibit these good properties without the addition of a plasticizer to the prepared dispersion. Also, the cured films prepared from the dispersions of this invention exhibit less clouding upon contact with water than Comparative Sample No. C.

TABLE II

| Sample No. | Tensile Strength (psi) | Elongation at Break (%) |
|---|---|---|
| B-1 | 3200 | 8.2 |
| B-2 | 3300 | 8.0 |
| B-C* | 1400 | 4.6 |

*Not an example of the invention.

Thus, it is seen that the blended films prepared using the dispersions of this invention have dramatically superior properties than blends prepared from conventional ethylcellulose dispersions.

What is claimed is:

1. A dispersion of plasticized polymeric particles comprising:
   (a) a continuous aqueous phase having dispersed therein
   (b) a plurality of particles, which particles comprise
      (1) a water-insoluble thermoplastic cellulose ether polymer and
      (2) a plasticizing composition which is compatible with and plasticizes said cellulose ether polymer, said plasticizing composition comprising an amount of a water-soluble salt of a fatty acid sufficient to stabilize the dispersion, said fatty acid being one which is a plasticizer for the cellulose ether polymer.

2. The dispersion of claim 1 wherein the salt of the fatty acid is an ammonium salt.

3. The dispersion of claim 2 wherein the plasticizing composition comprises about 20–30 percent of the combined weight of plasticizing composition and polymer.

4. The dispersion of claim 2 wherein the polymer is ethylcellulose.

5. The dispersion of claim 2 wherein the fatty acid is oleic, stearic, linoleic or ricinoleic acid.

6. The dispersion of claim 1 wherein the plasticizing composition further comprises another plasticizer for the polymer which other plasticizer is insoluble in water.

7. The dispersion of claim 6 wherein said other plasticizer comprises from about 10–20 weight percent of the combined weight of the plasticizing composition and polymer.

8. The dispersion of claim 6 wherein said other plasticizer is an alkyl ester of a fatty acid.

9. An article formed by the coalescence of the dispersion of claim 1.

10. A process for preparing an aqueous plasticized polymer dispersion comprising
   (a) melting together a mixture of a water-insoluble thermoplastic polymer with a plasticizing composition which is compatible with said polymer, said plasticizing composition comprising a carboxylic acid or salt thereof, said carboxylic acid being one which, when in salt form, emulsifies the polymer and stabilizes the resulting dispersion, then
   (b) contacting said melted mixture with an aqueous phase under conditions of shear and pH such that said heated plasticized mixture is dispersed into the aqueous phase as a plurality of particles and sufficient carboxylic acid is converted to salt form to emulsify the polymer and stabilize the dispersed polymer particles and then
   (c) cooling the resulting dispersion below the melting point of the polymer.

11. The process of claim 10 wherein the carboxylic acid is a fatty acid.

12. The process of claim 10 wherein the polymer is ethylcellulose.

13. The process of claim 10 wherein the aqueous phase is ammoniated water.

14. The process of claim 10 wherein the plasticizing composition comprises 20–30 weight percent of the combined weight of plasticizing composition and polymer.

15. The process of claim 10 which is a continuous process.

16. The process of claim 11 wherein the fatty acid is oleic, linoleic, or ricinoleic acid.

17. The process of claim 12 wherein the aqueous phase has dissolved therein a water-soluble cellulose ether.

18. The dispersion of claim 1 wherein said plasticizing composition comprises from about 8 to about 50 percent of the combined weight of the polymer and plasticizing composition.

19. An aqueous plasticized polymer dispersion produced according to the process of claim 10.

20. An aqueous plasticized polymer dispersion produced according to the process of claim 11.

21. An aqueous plasticized polymer dispersion produced according to the process of claim 12.

22. The process of claim 10 wherein the pH of the mixture is adjusted to between about 8.5 and about 11.5.

23. The process of claim 10 wherein the conditions of shear are produced by employing a static mixer.

24. The aqueous plasticized polymer dispersion of claim 21, wherein the particles have a volume average diameter of less than about 10 microns.

25. The aqueous plasticized polymer dispersion of claim 19, wherein the particles have a volume average diameter of less than about 10 microns.

26. A dispersion of plasticized polymer particles comprising:
   (a) a continuous aqueous phase having dispersed therein
   (b) a plurality of particles, which particles comprise
      (1) ethyl cellulose and
      (2) a plasticizing composition which is compatible with and plasticizes said ethyl cellulose, said plasticizing composition comprising an amount of a water-soluble ammonium salt of a fatty acid sufficient to stabilize the dispersion, said fatty acid being one which is a plasticizer for the ethyl cellulose.

* * * * *

UNITED STATES PATENT AND TRADEMARK OFFICE
CERTIFICATE OF CORRECTION

PATENT NO. : 4,502,888

DATED : March 5, 1985

INVENTOR(S) : Douglas E. Leng; Wilmer L. Sigelko; Frank L. Saunders

It is certified that error appears in the above—identified patent and that said Letters Patent is hereby corrected as shown below:

Claim 10, line 12, "heated" should read --heat--.

Signed and Sealed this

Thirtieth Day of July 1985

[SEAL]

Attest:

DONALD J. QUIGG

Attesting Officer — Acting Commissioner of Patents and Trademarks